United States Patent
Hwang et al.

(10) Patent No.: US 11,119,751 B2
(45) Date of Patent: Sep. 14, 2021

(54) SELF-LEARNING OPTIMIZED PATCH ORCHESTRATION

(71) Applicant: INTERNATIONAL BUSINESS MACHINES CORPORATION, Armonk, NY (US)

(72) Inventors: Jinho Hwang, Ossining, NY (US); Laura Murphy, Fort Collins, CO (US); Cindy J. Mullen, Madison, WI (US); Virginia Mayo Policarpio, Jersey City, NJ (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/512,778

(22) Filed: Jul. 16, 2019

(65) Prior Publication Data

US 2021/0019135 A1    Jan. 21, 2021

(51) Int. Cl.
*G06F 8/65*    (2018.01)
*G06F 8/61*    (2018.01)
(Continued)

(52) U.S. Cl.
CPC .............. *G06F 8/65* (2013.01); *G06F 8/433* (2013.01); *G06F 8/61* (2013.01); *G06F 8/658* (2018.02);
(Continued)

(58) Field of Classification Search
CPC ....... G06F 8/60–66; G06F 11/36–3696; G06F 8/433; G06F 8/61; G06F 8/65;
(Continued)

(56) References Cited

U.S. PATENT DOCUMENTS 7,765,538 B2    7/2010 Zweifel
8,261,353 B2    9/2012 Hirsave
(Continued)

FOREIGN PATENT DOCUMENTS

AU    20113364661 A    7/2013

OTHER PUBLICATIONS

Brandman, George. "Patching the Enterprise: Organizations of all sizes are spending considerable efforts on getting patch management right-their businesses depend on it." Queue 3.2 (2005): 32-39. (Year: 2005).*

(Continued)

*Primary Examiner* — Doon Y Chow
*Assistant Examiner* — Joanne G Macasiano
(74) *Attorney, Agent, or Firm* — Schmeiser, Olsen & Watts; Stephanie Carusillo

(57) ABSTRACT

A self-learning patch-orchestration system receives requests to install instances of two or more types of patches on sets of hardware or software components. The system retrieves information about past efforts to install the same types of patches, including historic failure rates of each type of patch and average durations of time required to successfully install each type of patch. The system identifies a set of candidate patch-orchestration plans, each of which specifies a different sequence in which to install the patches. The system uses the historical records to rank the plans based on the expected loss of scheduled installation time that would be caused by each plan's patch failures. The system selects as optimal the plan incurring the least amount of lost time and other adverse effects, and directs an orchestration engine or other downstream mechanisms to install the requested patches in accordance with the optimal orchestration plan.

14 Claims, 5 Drawing Sheets

(51) Int. Cl.
    *G06F 8/41*     (2018.01)
    *G06F 16/903*     (2019.01)
    *G06F 9/48*     (2006.01)
    *G06N 20/00*     (2019.01)
    *G06F 9/50*     (2006.01)
    *G06F 8/658*     (2018.01)

(52) U.S. Cl.
    CPC .......... *G06F 9/4881* (2013.01); *G06F 9/5005* (2013.01); *G06F 16/903* (2019.01); *G06N 20/00* (2019.01)

(58) Field of Classification Search
    CPC .... G06F 8/658; G06F 9/48881; G06F 9/5005; G06F 16/903; G06N 20/00
    See application file for complete search history.

(56) References Cited

U.S. PATENT DOCUMENTS

| | | | |
|---|---|---|---|
| 10,185,924 B1 | 1/2019 | Mcclintock | |
| 2006/0080656 A1 | 4/2006 | Cain | |
| 2007/0033445 A1 | 2/2007 | Hirsave | |
| 2007/0101336 A1* | 5/2007 | Moore | G06F 9/505 718/102 |
| 2009/0222811 A1 | 9/2009 | Faus | |
| 2016/0006666 A1* | 1/2016 | Nagesharao | G06F 8/60 709/226 |
| 2017/0235561 A1* | 8/2017 | Butler | G06F 8/654 717/168 |
| 2017/0364345 A1* | 12/2017 | Fontoura | G06F 9/5072 |
| 2018/0005146 A1 | 1/2018 | Chintalapaty | |
| 2018/0248750 A1* | 8/2018 | Johnston | G06F 8/65 |
| 2020/0012582 A1* | 1/2020 | Sharma | G06F 16/214 |
| 2020/0097279 A1* | 3/2020 | Mukhopadhyay | G06F 8/65 |

OTHER PUBLICATIONS

Chang, Chuan-Wen, Dwen-Ren Tsai, and Jui-Mi Tsai. "A cross-site patch management model and architecture design for large scale heterogeneous environment." Proceedings 39th Annual 2005 International Carnahan Conference on Security Technology. IEEE, 2005. (Year: 2005).*

Luo, Chao, Hiroyuki Okamura, and Tadashi Dohi. "Optimal planning for open source software updates." Proceedings of the Institution of Mechanical Engineers, Part O: Journal of Risk and Reliability 230.1 (2016): 44-53. (Year: 2016).*

Schramm, Schramm; Improving Performance of Automatic Program Repair using Learned Heuristics. In Proceedings of 2017 11th Joint Meeting of the European Software Engineering Conference and the ACM SIGSOFT Symposium on the Foundations of Software Engineering; Sep. 4-8, 2017 (ESEC/FSE'17); 3 pages.

Thuy, Hoang Van et al.; Automated Large Program Repair based on Big Code; In The Ninth International Symposium an Information and Communication Technology (SoICT 2018); Dec. 6-7, 2018; 7 pages.

Mell, Peter et al.; "The NIST Definition of Cloud Computing;" National Institute of Standards and Technology; Special Publication 800-145; Sep. 2011; 7 pages.

* cited by examiner

SELF-LEARNING OPTIMIZED PATCH ORCHESTRATION

BACKGROUND

The present invention relates in general to information technology and in particular to the orchestration of scheduled patches and updates.

Hardware, software, and infrastructure components of an enterprise, cloud, or other computing environment must be updated from time to time or when new vulnerabilities are reported. In environments that include large numbers of components, some of which are dependent upon the proper operation of other components, installing updates and patches may be facilitated an orchestration mechanism that determines the sequencing and scheduling of patches. Such orchestration mechanisms may be integrated into a platform-management stack or infrastructure-management utility. In other cases, orchestration tasks may be managed by multiple applications or tools mechanisms that are each compatible with a subset of the components that must be patched. Known orchestration mechanisms generally require human intervention to coordinate otherwise-independent patch-installation requirements and to resolve scheduling conflicts. Human administrators must also be available to address problems occurring when a failed attempt to patch a first component prevents patches from being installed on a second component.

SUMMARY

Embodiments of the present invention comprise systems, methods, and computer program products for a self-learning patch-orchestration system. The system receives requests to install a set of two or more types of patches on multiple sets of hardware or software components. The system retrieves archived, logged, or other archival information about past efforts to install the same types of patches on similar components. This archival information includes characteristics like each type of patch's average failure rate and the average amount of time required to successfully install each type of patch. The system identifies a set of candidate patch-orchestration plans, each of which specifies a different sequence in which to install the requested patches. Each plan includes an installation schedule that allocates a certain amount of time to each installation task, based on average installation times extracted from the archival information. The system then uses rules inferred from the historical records to rank the plans based on the expected loss of scheduled installation time that would be caused by each plan's patch failures. The system selects an optimal plan that would incur the least amount of lost time and directs an orchestration engine or other downstream systems to install the requested patches in accordance with the optimal orchestration plan.

DETAILED DESCRIPTION

Figure 1:
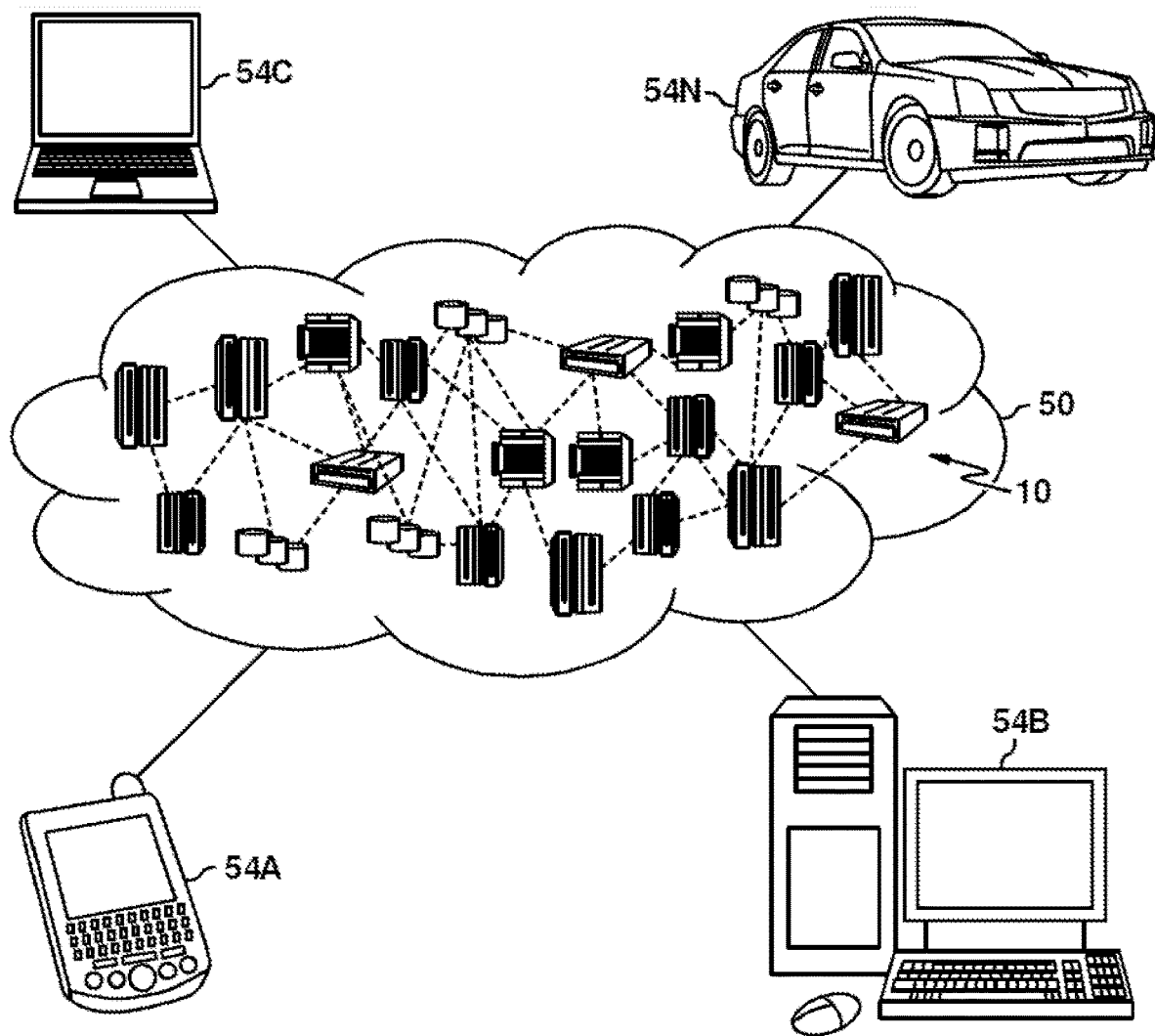
FIG. 1 depicts a cloud computing environment according to an embodiment of the present invention.

Patching and updating the large number of heterogeneous applications, services, and systems that make up an enterprise, cloud-computing, or other large computing environment can be complex and error-prone. Patches may be released frequently and at unpredictable times and proprietary installation utilities capable of automatically installing a patch on multiple devices are generally compatible only with a certain type of target application of hardware. In a large computing environment, many such tools may be required to patch every instance of physical machine, operating software, virtual machine, infrastructure component, cluster, container, application runtime, network device, or hosted service.

Even when humans are directly involved in patch scheduling, it can be challenging to determine how much time to allocate to each patch-installation and validation task. Patching schedules must be tailored to minimize disruptions that prevent users from accessing critical resources and must account for dependencies among patched components, such as a need for a computer firmware patch to succeed before attempting to patch an operating system running on that computer. Therefore, when one patch fails, in addition to rescheduling that one installation task, any patches scheduled to be performed on dependent components must also be rescheduled.

These and other logistical concerns may be partially alleviated by a patch-orchestration mechanism that automatically downloads and installs patches at scheduled times. The scheduling of each task in such an orchestration is generally chosen to minimize downtimes, a constraint that can result in allocating too little time to ensure that a patch is successfully installed and validated. Automated patch-orchestration systems may also fail to account for other technical and business constraints that not only make a patch failure more likely but increase the effort and time required to address adverse effects of such a failure.

For all these reasons, known patch-orchestration systems may be so vulnerable to failure and so lacking in automated failure-recovery functionality that they require significant amounts of human intervention to fully implement most patch-orchestration plans.

In one example, a software application can only be patched if the operating system that hosts the application is patched first. When the system patch fails, both patches must be rescheduled, and rescheduling may only be possible after the first failure is diagnosed or resolved.

In a more complex example, a patch-orchestration system coordinates installations, on each of 5,000 user devices, of an operating-system patch followed by two application patches. Users are notified that each devices will each be unavailable for one hour while the three patches are installed. 500 of the 5,000 operating-system patches fail, each preventing the application patches from being installed until a human technician can address the problem. Worse, even when these failed operating-system patches are successfully installed, an unknown number of each of the two application patches will fail.

If the three-patch installation effort cannot be completed on 460 devices within the allotted hour, 460 users will be running an application or operating system at a different revision level than that installed across the rest of the business. The patch-orchestration system will have to schedule a new patch-orchestration plan the next time that business or technical constraints can accommodate disruption of access to the 460 devices. Despite the automation benefits provided by the patch-orchestration system, a successful patching effort will require multiple instances of human intervention.

Embodiments of the present invention improve known patch-orchestration systems by using methods of cognitive analytics, machine-learning, or artificial intelligence to intelligently determine how to orchestrate complex patch activities, based on the results of prior patching efforts. These improvements provide benefits that include a lower rate of patch failure and an improved ability to recover from failures. Such embodiments more accurately allocate an optimal amount of time to complete each patch, account for component dependencies, patch dependencies, and scheduling conflicts, and are better able to select an optimal sequence in which to install patches. Such improved patch-orchestration systems can thus install patches more quickly and more reliably that existing systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
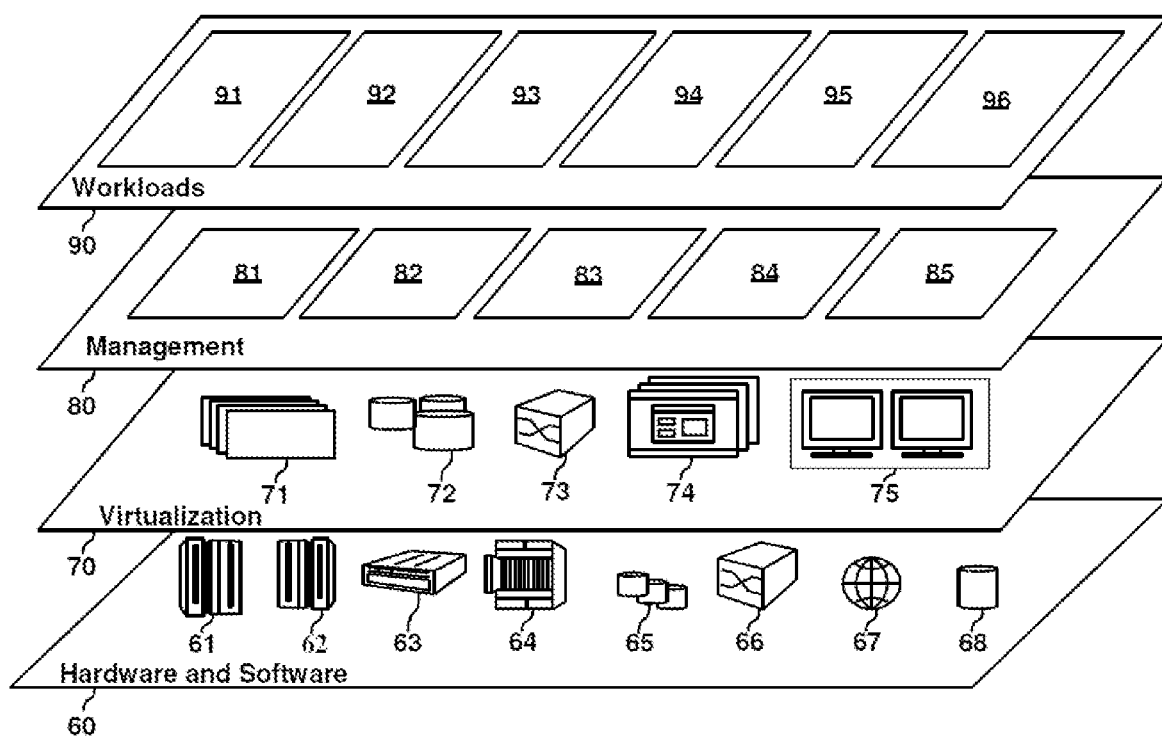
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of self-learning optimized patch orchestration.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
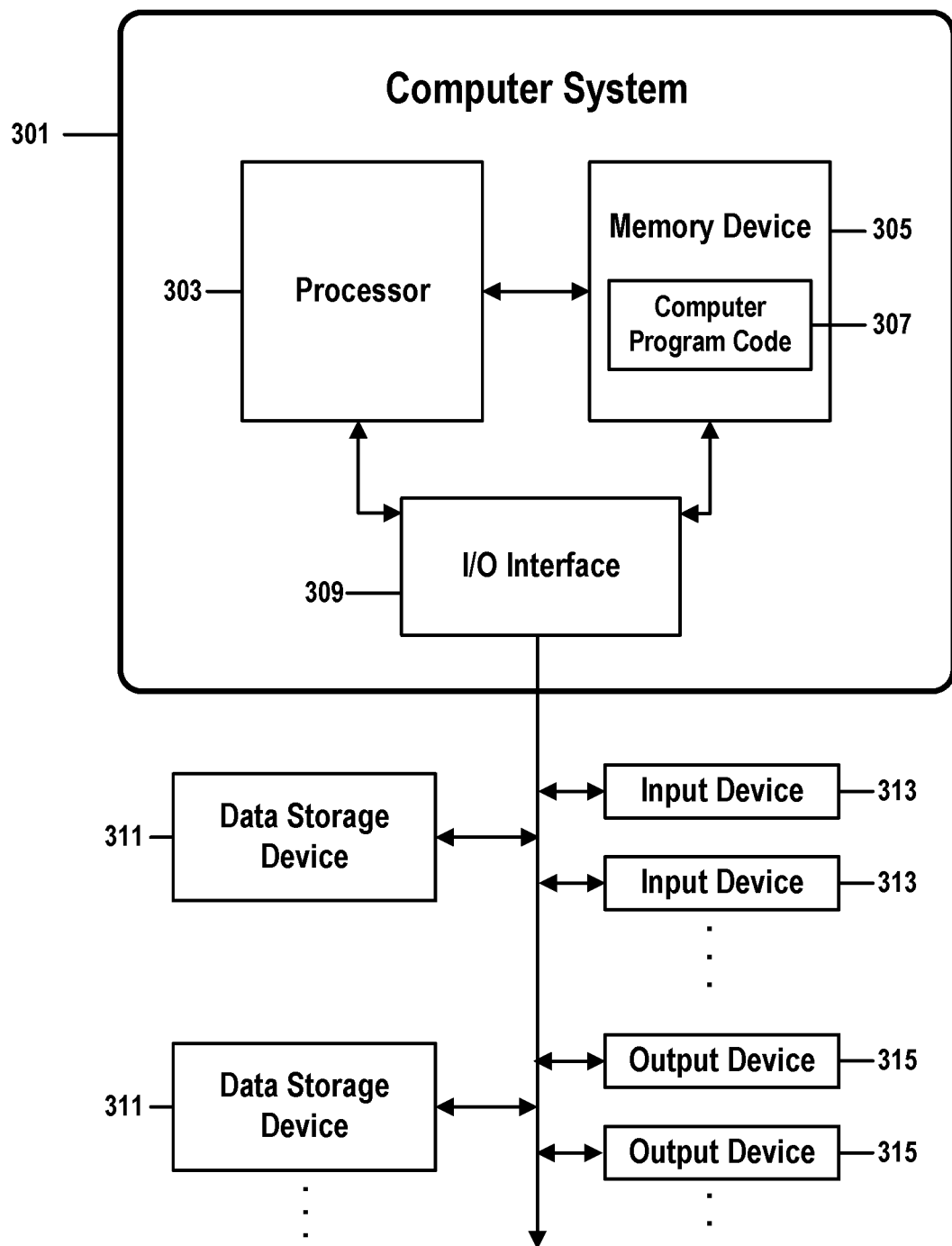
FIG. 3 shows the structure of a computer system and computer program code that may be used to implement a method for self-learning patch orchestration in accordance with embodiments of the present invention.

FIG. 3 shows a structure of a computer system and computer program code that may be used to implement a method for self-learning patch orchestration in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for self-learning patch orchestration in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for self-learning patch orchestration.

Any of the components of the present invention could be created, integrated, hosted, maintained, deployed, managed, serviced, supported, etc. by a service provider who offers to facilitate a method for self-learning patch orchestration. Thus the present invention discloses a process for deploying or integrating computing infrastructure, comprising integrating computer-readable code into the computer system 301, wherein the code in combination with the computer system 301 is capable of performing a method for self-learning patch orchestration.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for self-learning patch orchestration may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for self-learning patch orchestration is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
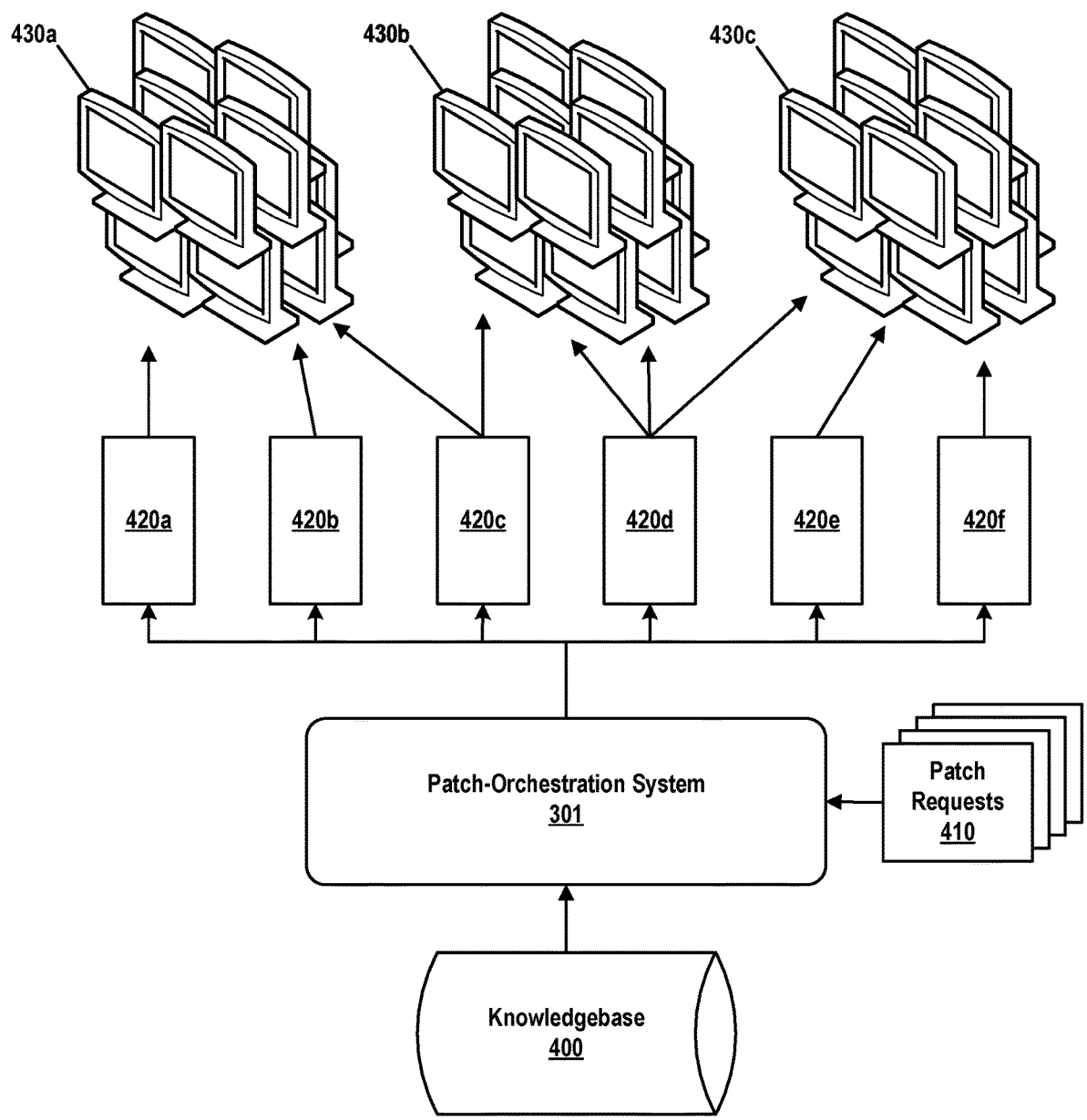
FIG. 4 shows a structure of a system for self-learning patch orchestration, which may be implemented on platforms that incorporate components of FIGS. 1-3, in accordance with embodiments of the present invention.

FIG. 4 shows a structure of a system for self-learning patch orchestration, which may be implemented on platforms that incorporate components of FIGS. 1-3, in accordance with embodiments of the present invention. FIG. 4 shows items 301 and 400-430c.

System 301 is an improved patch-orchestration system that may be implemented on a computer-system platform encompassing structures similar in form and function to identically numbered items FIG. 3. When system 301 receives one or more requests to install patches or updates on target entities 430a-430c, system 301, using rules, axioms, concepts and other knowledge stored in knowledgebase 400, intelligently derives an optimal patch-orchestration plan that directs patching mechanisms 420a-420f to install each patch in an optimal manner.

Patch targets 430a-430c can include any computerized hardware, software, or infrastructure component capable of being updated by a patching mechanism 420a-420f. Patching mechanisms 420a-420f can include any hardware or software application, tool, system, or other mechanism capable of receiving patch information from system 301 and, under the direction of system 301, installing and validating the patch on any of target entities 430a-430c.

Patch requests 410 may be received from any patch source capable of providing patch or update information to system 301. For example, a patch request 410 that includes a request to install a particular operating system update may be received from the software vendor from which the operating system was purchased or from the software manufacturer that designed the operating system. Such a patch request 410 may also include a copy of the update, instructions that explain how and when to install or validate the update, or an identification of a location from which the update can be retrieved.

Similarly, a patch request 410 may include a request to perform a physical update on a hardware-based network component, received from the manufacturer of the network component, from the software manufacturer that markets a network-management system that monitors the hardware component, or from a system-maintenance company responsible for administering a maintenance contract on network infrastructure that includes the hardware component. In this case the patch request 410 may also include instructions on how to perform or install the patch, an identification of a location at which to find related documentation of software, or information related to obtaining any hardware or tools necessary to install or validate the patch.

The knowledge stored in knowledgebase 400 is derived, through methods of cognitive analytics, machine-learning, or other artificially intelligent technologies, from past records and feedback describing the results of past efforts to install and validate patches similar to a requested patch 410, performed by updating mechanisms similar to mechanisms 420a-420f, or performed on target entities similar to entities 430a-430c.

The patch-orchestration plan derived by system 301 uses knowledge stored in the knowledgebase 400 to determine an optimal sequence and schedule with which to perform the patches. The optimal orchestration plan may, for example, specify a time at which each patch should be installed, the order in which patches should be installed, the order in which entities 430a-430c should be patched, the sequence in which patches should be installed on a particular entity of entities 430a-430c, criteria by which the success of each installation should be evaluated, or the duration of time that should be allotted for each patching task. System 301 selects these or other details of the orchestration plan based on knowledge of past failure rates, dependencies among patched entities, and other factors that system 301 inferred from the contents of knowledgebase 400 as having affected the success of past patch efforts.

Figure 5:
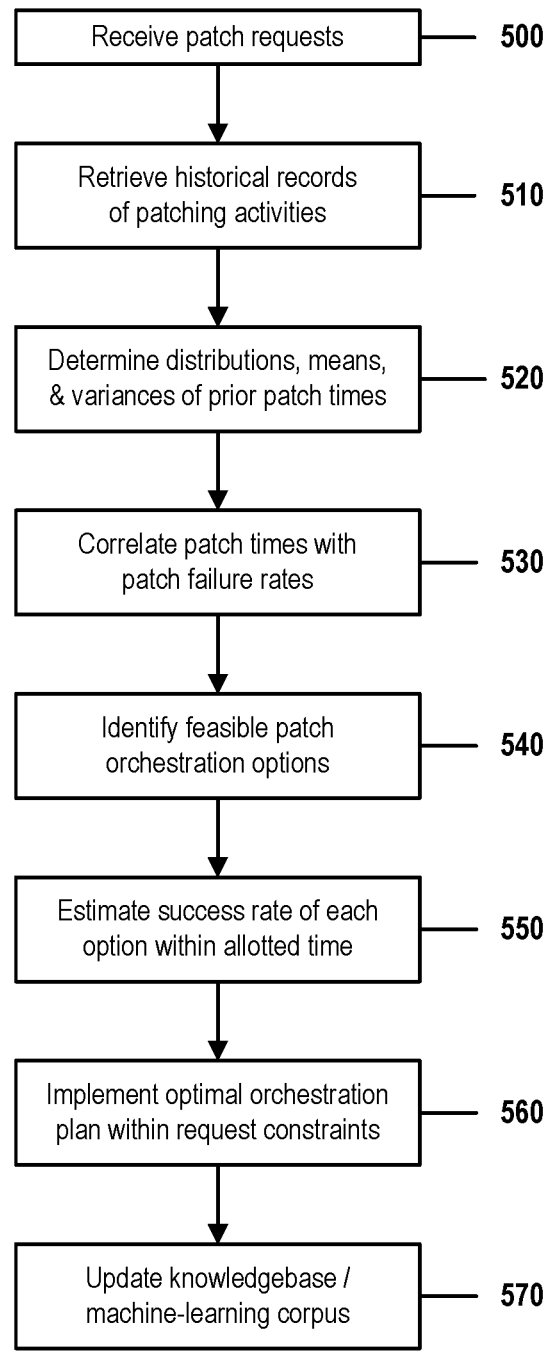
FIG. 5 is a flow chart that shows steps of a method for self-learning patch orchestration in accordance with embodiments of the present invention.

FIG. 5 is a flow chart that shows steps of a method for self-learning patch orchestration in accordance with embodiments of the present invention. FIG. 5 contains steps 500-570 which may be performed by embodiments that incorporate components described in FIGS. 1-4.

In step 500, improved patch-orchestration system 301 receives one or more requests 410 to install one or more patches on one or more target entities 430a-430c. The requests 410, the sources of the requests 410, and the targets 430a-430c are identical in form and function to similarly numbered items described in FIG. 4.

In step 510, system 301 retrieves from knowledgebase 400 rules, axioms, concepts, or other types of knowledge, as described in FIG. 4, from which system 301 can infer factors capable of affecting the success of patch-installation and validation tasks to be performed in response to receiving the patch requests 410 in step 500.

The inferred factors may include, but are not limited to, a combination of:

rules, based on past patch installations, that allow system 301 to identify which entities of target entities 430a-430c should receive the requested patches 410;

characteristics of past patch-installation efforts, such as past installation-success rates, including means and variations of statistical distributions of past success rates, when installing specific types of patches on particular types of entities, and scheduling information that allows system 301 to identify times or dates on which previous patches have most often been installed successfully on certain entities 430a-430c, or that have allowed certain durations of time to be allocated for the installation of specific patches on specific entities 430a-430c;

relationships between the durations of time allocated in the past to perform patch-installation or validation tasks similar to the tasks required by patch request 410, and the relative success rates of those tasks as functions of the durations of time; and dependencies among target entities 430a-430c from which may be inferred corresponding dependencies among requested patches or a preferred order of installation for requested patches.

The knowledge stored in knowledgebase 400 from which these and other inferences may be made may be stored in any manner known in the field of artificial intelligence, machine learning, cognitive analytics, or related fields. For example, the knowledge may be stored as sets of subject-predicate-object triplets, rules, or axioms, as a set of multi-dimensional vectors, or as a directed graph in which nodes of the graph represent semantically meaningful concepts and an edge between two nodes represents a dependency relationship between a pair of concepts represented by the two nodes.

This knowledge may have been culled, inferred, aggregated, or otherwise extracted from sources like logs of past patch efforts undertaken by target entities 430a-430c, published or private historical records that identify success rates, patch times, and other characteristics of various patching activities performed by extrinsic systems, or generally accepted industry knowledge about general characteristics of such patching activities. The knowledge may have been extracted by any means known in the art of machine-learning, cognitive analytics, or other fields that comprise self-learning applications or artificial intelligence.

In one example, knowledge stored in knowledgebase 400 may facilitate an inference that security updates to an instance of a popular operating system and a word-processing program that runs under that instance have in the past sustained at least a 90% success rate when at least fifteen minutes is allocated to the updates, but only an average 77% success rate when under ten minutes is allocated.

In a related example, other knowledge stored in knowledgebase 400 could indicate that performing the two-patch update with a mean success rate of 98% and a confidence factor of 95% requires allocating a total of at least twelve minutes to the two patches. In a third example, knowledge stored in knowledgebase 400 may allow system 301 to infer a dependency relationship between the two security patches. In this case, system 301 may further infer from the stored knowledge that: i) the operating-system patch has an overall success rate of 80%; and ii) given a successful operating-system patch, the dependent word-processor patch has a success rate of 95%. System 301 might then infer from these conclusions that, all things equal, the two-patch update should have an overall success rate of 76%.

In cases where multiple patches can be installed in different sequences, system 301 may infer from knowledge stored in knowledgebase 400 that each sequence may have a different probability of success. In one example, the patch requests 410 specify a set of three patches that may be installed in any order, subject to the condition that a failure of any of the three patches prematurely terminates the three-patch sequence. If patches #1, #2, and #3 have been installed in the past with, respectively, independent failure rates of 3%, 2%, and 1%, the system might determine that installing the three patches in the sequence patch3-patch2-patch1 provides the greatest chance that at least some patches will be successful. This inference is based on the observation that installing the patches that have the highest success rate first result in the lowest likelihood that the patch sequence will be prematurely terminated before any patches can be installed.

Similar considerations can exist when unidentified dependencies exist among patches requested by a multiple-patch request 410. For example, a patch request 410 may indicate that it is possible to install a word-processor patch either before or after installing an operating-system patch. But historical records and inferences stored in knowledgebase 400 may indicate an intrinsic dependency in which the word-processor patch almost always fails if installed before a corresponding operating-system patch. As in the previous example, such inferences allow system 301 to determine that only one of the possible installation sequences can be considered optimal.

Descriptions of subsequent steps of the method of FIG. 5 provide more details about how system 301 can derive inferences like those in the above examples from knowledge stored in knowledgebase 400. These descriptions should not, however, be construed to limit embodiments to the examples described here. In general, the intelligent, self-learning system 301 may employ any known cognitive method or technology by which an artificially intelligent system can be trained to intelligently devise an optimal patch-orchestration plan based on knowledge culled from past patch-installation efforts.

In some embodiments, system 301 may in this and subsequent steps of FIG. 5 consider only prior patching activities similar to those required to satisfy the current patch requests 410. For example, if patch requests 410 request that a particular transaction-processing application be patched, system 301 throughout the steps of FIG. 5, would consider only stored knowledge derived from records of prior patching efforts that comprise installing patches on the same transaction-processing application.

In step 520, system 301 continues this inferential process by determining the mean times and variances in the times of previous patching activities. These determinations may be based on information retrieved from knowledgebase 400 in step 510 and may correlate various means and variances with characteristics of patching activities that may include: the type of patch being installed; the duration of time allocated to or consumed by a patching activity; the target entity being patched; whether the patching activity was performed by an automated patching mechanism, such as mechanisms 420a-420f, or by a human expert; and the existence of service or maintenance tickets associated with each relevant type of patching activity.

In step 530, the system 301 continues its cognitive or inferential process by correlating patch times of each type of relevant patch activity with success or failure rates of those relevant activities. This correlating may be performed by any means known in the art, such as by straightforward comparison, aggregation, or statistical analysis of log records represented by knowledge stored in knowledgebase 400.

For example, if patch request 410 requests that all instances of a network-interface card be updated by patching the cards' firmware, system 301 would in this step identify, from the information retrieved from knowledgebase 400 or from extrinsic log files or other records, all past patching efforts directed at firmware patches to the same cards.

System 301 would then retrieve from the identified records information identifying the duration of time consumed or allotted to each of the patching efforts and would attempt to correlate these durations of time with the success or failure rate of the patching efforts.

For example, system 301 might identify a statistical distribution of durations of time required to perform the particular type of patch requested by patch request 410 and would then correlate these durations with a distribution of the success or failure rate of the patches as a function of each patch's required duration of time. Optionally incorporating the means and variances of these distributions into its analysis, system 301 would then correlate patch times with a relative installation-success rate.

In step 540, system 301 identifies feasible patch-orchestration plans capable of satisfying patch requests 410. For example, the patch requests 410 might request the installation of four types of patches to be installed, respectively, on a particular type of physical workstation platform, on instances of host operating systems running on the workstations, on a particular type of virtual machine provisioned on instances of that host operating system installed on the workstations, and on a particular virtual private network (VPN) software product running on the provisioned instances of the virtual machine. System 301 in this step might respond by inferring from information retrieved from knowledgebase 400, or from other information retrieved from extrinsic sources, that these four patches can theoretically be installed in any of the sixteen possible sequences. This determination might be further based on a determination, from the retrieved information, that the four patches are at least theoretically capable of being installed independently and that prior installation efforts have on occasion successfully installed the four patches, regardless of installation sequence.

This example should not be construed to suggest that system 301 will always determine that all possible installation sequences are feasible. For example, if system 301 retrieves information indicating that VPN patches can only be installed on fully updated host operating systems, system 301 would not consider any orchestration plans that attempt to install the VPN patch before the host operating system patch to be feasible. Similarly, if a patch request of the requests 410 indicate that a certain subset of the patches must be installed in a certain order, than any orchestration plan that does not observe the certain order would not be considered to be feasible. Similarly, if retrieved or received information identifies more than one patch to be installed on the same hardware or software entity, system 301 would not consider feasible any orchestration plan or patching sequence that would result in the concurrent installation of two patches installed on that same entity.

In step 550, system 301 estimates the relative success rate of each orchestration sequence identified in step 540. In certain embodiments, this step comprises the ad hoc generation of a cognitive, machine-learning, or other type of intelligent model capable of generating an optimal patch-orchestration plan. This optimal plan specifies an installation sequence and schedule, and the durations of time that should be allocated to install each patch in order to produce a highest acceptable success rate, subject to predetermined timing and scheduling constraints.

System 301 in this step may consider any of the types of information made available to system 301 in earlier steps of the method of FIG. 5, or that are available from records and logs provided by an implementer. In addition to knowledge stored in knowledgebase 400, this information can include, but is not limited to, known types of sources like application and system logs, maintenance records, shell-execution histories, user activity and resource-access histories, system-inventory records, hardware, software, and network configuration files, transaction logs, holiday and business-activity schedules, and resource-scheduling information.

In one exemplary embodiment, a likely failure rate of a particular candidate orchestration plan may be based on values of a set of elements of a set of vectors, where each vector represents one requested patch or one subtask comprised by a requested patch. These vector elements might each represent a parameter like: a patch type or patch identifier; an inventory number, device type, configuration, or state of each entity to be patched; the duration of time available to install the patch; the historical failure rate of previous attempts to install this type of patch; a listing of other patch-related tasks upon which the patch is dependent, or that depend upon successful installation of the patch; and an identification of whether the patch installation requires manual human intervention.

In some embodiments, the failure rates represented by each such vector can then be incorporated into a self-learning model, in which each candidate orchestration plan is represented as a matrix in which each entry identifies a rate of failure associated with attempting to install a particular patch subject to boundary conditions identified by the corresponding vector. The organization of the vectors in the matrix can, by convention, represent a sequence in which a corresponding orchestration plan attempts to install each patch. Traversing a path through the matrix would thus allow system 301 to determine an overall success or failure rate of the corresponding orchestration plan.

Other embodiments may model the inferred characteristics of each candidate plan in any other manner known in the art. Models may, for example, model the orchestration-selection process as a Markov decision process (MDP) based on the memoryless "Markov" property of failure rates that occur in stochastic processes, where a transition probability is a function only of an operator's state, not on the path by which the state was reached. Such a property is a credible representation of properties that define the failure risk of a single patch because the failure rate of a single patch depends only upon the vector values associated with that patch, regardless of which patches are installed before or after that patch. In yet another example, each orchestration plan may be represented as a finite-state machine in which each state of the finite-state machine represents a patch-installation task.

Regardless of the method of representation, however, all embodiments in this step incorporate a known analytical method to determine relative expected failure rates of each orchestration plan, and this analytical method may include the development of one or more models capable of being incorporated into an application of machine-learning or cognitive-analytics technology.

In step 560, system 301 implements the optimal orchestration plan selected in step 550. This implementation may be performed by any means known in the art, such as by directing an orchestration layer of a cloud-management platform or a proprietary or platform-dependent orchestration mechanism 420a-420f to install the patches requested by the patch requests 410. In some cases, certain steps of the orchestration plan may be performed manually by human experts, but in other embodiments, the entire patch-orchestration procedure is performed automatically by downstream modules or systems 420a-420f.

In step 570, system 301 optionally receives feedback about the success of each patch task implemented in step 560. This feedback can be generated automatically, as by logging, performance-monitoring, or maintenance utilities that record system activities, or by manually entered human feedback. The feedback can identify any parameter or characteristic of some or all of the patch installations attempted in step 560, such as the duration of time required to install a patch, the success or failure of a particular patch, or the overall success rate of a patch that was to be installed on multiple targets 430a-430c.

This feedback can them be used to update knowledgebase 400 with more current information about the success of system 301's selection of an optimal orchestration plan, or may be incorporated into a training corpus of a type used by machine-learning technologies to further train system 301 to more accurately select optimal orchestration plans in the future.

The method of FIG. 5 may be further illustrated by the below example.

Consider an embodiment of the present invention comprising a system 400 that receives a request 410 to install three patches on a large number of target entities 430a-430c owned by a target organization. The three patches may be installed in any order, but a failure of any of the three at any point in a three-patch sequence halts the entire sequence.

System 400 responds to the request by installing, or directing mechanisms 420a-420f to install, the patches according to an optimal patch-orchestration plan. System 400 intelligently selects as the optimal plan an orchestration plan that will have the least adverse effect on the organization, due to patch failures, within time constraints necessitated by the organization. In this example, the least adverse effect is a function of both the total number of expected failures of each of the three patches and the resulting loss of time caused by the failures. The optimal plan is the orchestration plan that minimizes this loss of time caused by failures.

System 400 begins identifying an optimal plan by retrieving historical records, logs, and other information about similar patch efforts conducted in the past. In this example, each installation attempt may be represented by a vector comprised of elements that identify: patch type, patched entity, device/inventory-type/state, patch-installation duration, # of failures encountered during the patching effort, and whether the patch was performed by automated or manual means.

For example, one previous attempt to install a patch similar to patch #1 might be described by a vector (OS patch, WANOS 2008 SP2, normal state, 10 min, 0, automated). This vector would be interpreted by system 400 as identifying that an attempt to install a patch similar to patch #1 can be characterized as an attempt to install an operating-system patch to an instance of a "WANOS 2008 SP2" operating system running in a normal (production-mode) state, where the patch did not sustain an installation failure and took a total ten minutes to be installed by an automated patch-installation mechanism.

System 400 aggregates all such vectors in order to derive, for each of the three patches, an average historical failure rate and an average historical installation time. These averages can be summarized by Table 1:

TABLE 1

| Patch ID | Failure Rate | Average Patch Duration |
|---|---|---|
| 1 | 8.0% | 20 minutes |
| 2 | 6.0% | 5 minutes |
| 3 | 2.0% | 5 minutes |

The first row in Table 1 shows, for example, that past attempts to install patches similar to patch #1—that is, patches characterized by vectors that identify the same patch type, patch entity, automated/manual installation mechanism, or other values deemed relevant by an implementer—have failed an average of 8.0% of the time and have on average required 20 minutes to complete successfully. Note that the patches should be installed in sequence due to orchestration criteria or inter-patch dependencies that require certain activities to happen before or after each patch. In such cases, a failure of one patch in an installation sequence halts the installation of all patches remaining in the sequence.

System 400 then constructs six possible orchestration plans, each of which identifies a unique, distinct sequence in which to install the three patches, and each of which allocates to each patch installation time equal to that patch's historical average patch duration. In other words, each orchestration plans would schedule the installations in a manner that allocates 20 minutes to install patch #1, 5 minutes to install patch #2, and 5 minutes to install patch #3, differing only in the order in which the three patches are installed.

For example, an orchestration plan $$3 \rightarrow 1 \rightarrow 2$$

would represent an installation sequence in which 20 minutes are allocated to install patch #3, and 5 minutes are allocated to install patch #2 if patches #3 and #1 are successful.

System 400 evaluates each of the six possible orchestration plans and assigns an adverse-effect value to each one. Each computed value of the adverse-effect parameter identifies the amount of time lost due to patch failures when patches are orchestrated according to a corresponding plan. The adverse-effect calculations may be performed by any means desired by an implementer. This example illustrates one such computation method.

In some embodiments, an implementer might desire to use a different parameter to select an optimal orchestration plan. For example, an optimal orchestration plan may be the plan that minimizes a maximum patch-failure rate or a total downtime suffered by a certain mission-critical function. Again, the present invention is flexible enough to accommodate any sort of measurement and any sort of method of computing that measurement that is preferred by an implementer.

In the current example, an adverse-effect value is computed for orchestration plan $$3 \rightarrow 1 \rightarrow 2$$

as the sum of the expected loss of scheduled patch time due to:
  i) failures when installing patch #3, plus
  ii) failures when installing patch #1 when patch #3 is successful, plus
  iii) failures when installing patch #2 when patches #3 and #1 are successful.

Here, there is a 2% chance of patch #3 failing. If patch #3 fails, the entire three-patch sequence fails, costing the patch schedule the entire 30 minutes of scheduled time allocated to the three-patch sequence. The aggregate adverse effect of this time loss is computed as the product of the failure rate and the time lost by each failure=0.02*30=0.6.

Similarly, if patch #3 is successful, patch #1 has an 8% chance of failing. The total chance that patch #1 will fail given a (98% likely) successful patch #3 installation is therefore the product of the probabilities of these two events occurring=(0.98)*(0.8)=7.8%. A failure of patch #1 costs the schedule a total of 25 minutes, the total time allocated to patches #1 and #2, neither of which can now be installed. The adverse effect of a patch #1 failure under this orchestration plan is thus 0.78*25=1.95.

Finally, given that patch #2 has a 6% chance of failing, that the probability that both patches #3 and #1 are successful=90% (computed as 0.98*0.92), and that a patch #2 failure will cost the schedule only the 5 minutes remaining in the patch sequence, the adverse effect of a patch #2 failure=0.06*0.9*5=0.027.

The total adverse effect of orchestration plan 3→1→2 is thus the sum of the adverse effects of the three types of failures=0.6+1.95+0.027=2.82.

The system computes adverse-effect values for the other five possible orchestration plans by performing similar calculations:

3→2→1:(2% fail 3*30)+(5.8% fail 2,1*25)+(7.3% fail 1*20)=3.51

1→2→3:(8% fail 1*30)+(5.5% fail 2,3*10)+(1.7% fail 3*5)=3.04

2→1→3:(6% fail 2*30)+(7.5% fail 1,3*25)+(1.7% fail 3*5)=3.76

2→3→1:(6% fail 2*30)+(1.8% fail 3,1*25)+(7.3% fail 1*20)=3.71

1→3→2:(8% fail 1*30)+(1.8% fail 3,2*10)+(5.4% fail 2*5)=2.85

Comparing the resulting adverse-failure values reveals that the first orchestration plan to be evaluated, which would install instances of the three-patch set in the sequence 3→1→2, has a 2.82 adverse-effect score that is lower than the score of any of the other feasible orchestration plans. This orchestration plan is thus deemed to be optimal because it minimizes, based on inferences made from historical records, the total amount of scheduled time lost due to patch failures.

System 400 then implements this optimal orchestration plan by scheduling each instance of the selected three-patch job to be installed in the sequence 3→1→2, allocating 5 minutes, 20 minutes, and 5 minutes, respectively to each of the three patches, and optionally directing each manual or automated orchestration mechanism to physically install the patches in accordance with the optimal plan.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A self-learning patch-orchestration system comprising a processor, a memory coupled to the processor, and a computer-readable hardware storage device coupled to the processor, the storage device containing program code configured to be run by the processor via the memory to implement a method for self-learning patch orchestration, the method comprising:

the processor receiving a request to install instances of two or more types of patches, where each instance of the two or more types of patches is to be installed on a distinct set of hardware or software components;

the processor retrieving historic information about past efforts to install patches of the two or more types;

the processor identifying a set of candidate patch-orchestration plans, where each plan of the candidate plans specifies a distinct sequence in which to install the requested patches and an amount of time to schedule for installation of each type of patch that is equal to the average amount of time required to install each type of patch during previous installations;

the processor ranking the candidate plans according to an amount of an adverse effect caused by each plan's expected number of failures,
- where a first adverse effect of a first plan of the candidate plans is proportional to an amount of scheduled installation time lost due to installation failures when implementing the first plan, and
- where the amount of scheduled installation time lost due to installation failures when implementing the first plan is a function of, for each type of patch to be installed by the first plan, a product of a predicted number of installation failures of the each patch and an amount of scheduled installation time lost by each installation failure of the each patch;

the processor selecting an optimal plan from the candidate plans, where the ranking has identified the optimal plan as causing less adverse effect than any other plan of the candidate plans; and the processor directing a downstream patching mechanism to install the requested patches according to a schedule identified by the optimal orchestration plan.

2. The system of claim 1, where the ranking is performed by deriving from the retrieved historic information a self-learning model that predicts, for each candidate orchestration plan, a number of installation failures of each type of requested patch and an average duration of time required to install each type of requested patch.

3. The system of claim 1, where an expected number of failures of a first type of patch under a first plan of the candidate plans is derived from an identification, by the retrieved historic information, of a number of past failures of the first type of patch.

4. The system of claim 1,
- where the candidate patch-orchestration plans each specify a distinct feasible sequence in which to install the requested patches, and
- where a first feasible sequence is an installation sequence that is free from dependency relationships between different types of patches that would prevent the requested patches from being installed in the first feasible sequence.

5. The system of claim 1,
- where the retrieved historic information identifies, for a first patch-installation effort of the past efforts, a set of characteristics that characterize the first patch-installation effort, and
- where each characteristic is selected from the group consisting of:
  - an indication of whether the first effort was successful;
  - an identification of a hardware or software entity that was to be patched by the first effort;
  - an identification of a type of hardware or software entity that was to be patched by the first effort;
  - an indication of whether the first effort was attempted by a manual process or by an automated process;
  - if the first effort was successful, a duration of time that was required to complete the first effort; and
  - if the first effort was successful, a number of errors that occurred during the installation process.

6. A method for self-learning patch orchestration, the method comprising:

a self-learning patch-orchestration system receiving a request to install instances of two or more types of patches, where each instance of the two or more types of patches is to be installed on a distinct set of hardware or software components;

the system retrieving historic information about past efforts to install patches of the two or more types;

the system identifying a set of candidate patch-orchestration plans, where each plan of the candidate plans specifies a distinct sequence in which to install the requested patches and an amount of time to schedule for installation of each type of patch that is equal to the average amount of time required to install each type of patch during previous installations;

the processor ranking the candidate plans according to an amount of an adverse effect caused by each plan's expected number of failures,
- where a first adverse effect of a first plan of the candidate plans is proportional to an amount of scheduled installation time lost due to installation failures when implementing the first plan, and
- where the amount of scheduled installation time lost due to installation failures when implementing the first plan is a function of, for each type of patch to be installed by the first plan, a product of a predicted number of installation failures of the each patch and an amount of scheduled installation time lost by each installation failure of the each patch;

the system selecting an optimal plan from the candidate plans, where the ranking has identified the optimal plan as causing less adverse effect than any other plan of the candidate plans; and the system directing a downstream patching mechanism to install the requested patches according to a schedule identified by the optimal orchestration plan.

7. The method of claim 6, where the ranking is performed by deriving from the retrieved historic information a self-learning model that predicts, for each candidate orchestration plan, a number of installation failures of each type of requested patch and an average duration of time required to install each type of requested patch.

8. The method of claim 6, where an expected number of failures of a first type of patch under a first plan of the candidate plans is derived from an identification, by the retrieved historic information, of a number of past failures of the first type of patch.

9. The method of claim 6,
- where the candidate patch-orchestration plans each specify a distinct feasible sequence in which to install the requested patches, and
- where a first feasible sequence is an installation sequence that is free from dependency relationships between different types of patches that would prevent the requested patches from being installed in the first feasible sequence.

10. The method of claim 6, further comprising providing at least one support service for at least one of creating, integrating, hosting, maintaining, and deploying computer-readable program code in the computer system, wherein the computer-readable program code in combination with the computer system is configured to implement the receiving, the retrieving, the identifying, the ranking, the selecting, and the directing.

11. A computer program product, comprising a computer-readable hardware storage device having a computer-readable program code stored therein, the program code configured to be executed by a self-learning patch-orchestration system comprising a processor, a memory coupled to the processor, and a computer-readable hardware storage device coupled to the processor, the storage device containing program code configured to be run by the processor via the memory to implement a method for self-learning patch orchestration, the method comprising:

- the processor receiving a request to install instances of two or more types of patches, where each instance of the two or more types of patches is to be installed on a distinct set of hardware or software components;
- the processor retrieving historic information about past efforts to install patches of the two or more types;
- the processor identifying a set of candidate patch-orchestration plans, where each plan of the candidate plans specifies a distinct sequence in which to install the requested patches and an amount of time to schedule for installation of each type of patch that is equal to the average amount of time required to install each type of patch during previous installations;
- the processor ranking the candidate plans according to an amount of an adverse effect caused by each plan's expected number of failures,
  - where a first adverse effect of a first plan of the candidate plans is proportional to an amount of scheduled installation time lost due to installation failures when implementing the first plan, and
  - where the amount of scheduled installation time lost due to installation failures when implementing the first plan is a function of, for each type of patch to be installed by the first plan, a product of a predicted number of installation failures of the each patch and an amount of scheduled installation time lost by each installation failure of the each patch;
- the processor selecting an optimal plan from the candidate plans, where the ranking has identified the optimal plan as causing less adverse effect than any other plan of the candidate plans; and
- the processor directing a downstream patching mechanism to install the requested patches according to a schedule identified by the optimal orchestration plan.

12. The computer program product of claim 11, where the ranking is performed by deriving from the retrieved historic information a self-learning model that predicts, for each candidate orchestration plan, a number of installation failures of each type of requested patch and an average duration of time required to install each type of requested patch.

13. The computer program product of claim 11, where an expected number of failures of a first type of patch under a first plan of the candidate plans is derived from an identification, by the retrieved historic information, of a number of past failures of the first type of patch.

14. The computer program product of claim 11, where the retrieved historic information identifies, for a first patch-installation effort of the past efforts, a set of characteristics that characterize the first patch-installation effort, and where each characteristic is selected from the group consisting of:
- an indication of whether the first effort was successful;
- an identification of a hardware or software entity that was to be patched by the first effort;
- an identification of a type of hardware or software entity that was to be patched by the first effort;
- an indication of whether the first effort was attempted by a manual process or by an automated process;
- if the first effort was successful, a duration of time that was required to complete the first effort; and
- if the first effort was successful, a number of errors that occurred during the installation process.

* * * * *